(12) United States Patent
Liao et al.

(10) Patent No.: US 11,650,096 B2
(45) Date of Patent: May 16, 2023

(54) DEVICE FOR SENSING INFRARED RADIATION

(71) Applicant: Dongguan Bonteck Hardware Co., LTD, Dongguan (CN)

(72) Inventors: Junnan Liao, Dongguan (CN); Junyun Liao, Dongguan (CN); Enwang Liao, Dongguan (CN); Haifu Zou, Dongguan (CN)

(73) Assignees: Dongguan Bonteck Hardware Co., LTD, Dongguan (CN); Junnan Liao, Dongguan (CN)

( * ) Notice: Subject to any disclaimer, the term of this patent is extended or adjusted under 35 U.S.C. 154(b) by 78 days.

(21) Appl. No.: 17/213,429

(22) Filed: Mar. 26, 2021

(65) Prior Publication Data

US 2022/0170782 A1    Jun. 2, 2022

(30) Foreign Application Priority Data

Dec. 1, 2020  (CN) .......................... 202022840776.8

(51) Int. Cl.
| | | |
|---|---|---|
| *G01J 1/02* | (2006.01) | |
| *G01J 1/04* | (2006.01) | |
| *G01J 1/42* | (2006.01) | |
| *G02B 3/08* | (2006.01) | |

(52) U.S. Cl.
CPC ........... *G01J 1/0271* (2013.01); *G01J 1/0411* (2013.01); *G01J 1/42* (2013.01); *G02B 3/08* (2013.01)

(58) Field of Classification Search
CPC .......... G01J 1/0271; G01J 1/0411; G01J 1/42; G02B 3/08; Y02B 20/40
See application file for complete search history.

(56) References Cited

U.S. PATENT DOCUMENTS

| | | | | | |
|---|---|---|---|---|---|
| 2,328,421 | A | * | 8/1943 | Carlson ................. | H02G 3/125 220/3.9 |
| 4,451,733 | A | * | 5/1984 | Avery .................. | G08B 13/193 250/342 |
| 5,626,417 | A | * | 5/1997 | McCavit ................ | F21S 8/033 340/567 |
| 6,082,894 | A | * | 7/2000 | Batko .................... | G08B 13/19 340/567 |
| 9,570,835 | B2 | * | 2/2017 | Newell .................... | H02G 3/18 |
| 2010/0172143 | A1 | * | 7/2010 | Cunius .................... | F21V 29/77 362/373 |
| 2012/0061137 | A1 | * | 3/2012 | Temblador ............. | H02G 3/085 174/559 |
| 2013/0043396 | A1 | * | 2/2013 | Shpater ................ | G08B 13/193 250/353 |

(Continued)

*Primary Examiner* — Marcus H Taningco
(74) *Attorney, Agent, or Firm* — Marcus C. Dawes

(57) ABSTRACT

A device for sensing infrared radiation is provided. The device for sensing infrared radiation includes a shell, a bottom cover, a Fresnel lens, an upper wire outlet hole, a lower wire outlet hole, a side wire outlet hole and an infrared probe. The infrared probe is arranged inside the shell, the shell is provided with an arc-shaped notch configured for arranging the Fresnel lens. The upper wire outlet hole is arranged on the shell and configured for leading wires, the lower wire outlet hole is provided on the bottom cover of the shell and configured for leading wires, and the side wire outlet hole is provided on the shell and configured for leading wires.

9 Claims, 5 Drawing Sheets

(56) References Cited

U.S. PATENT DOCUMENTS

| | | | | |
|---|---|---|---|---|
| 2014/0197165 A1* | 7/2014 | Korcz | ............... | H02G 3/10 |
| | | | | 220/3.9 |
| 2014/0354428 A1* | 12/2014 | Xu | ............... | G08B 29/22 |
| | | | | 340/541 |
| 2017/0115164 A1* | 4/2017 | Peterson | ............... | G01J 5/0806 |
| 2021/0270995 A1* | 9/2021 | Ikeda | ............... | G01V 8/20 |
| 2021/0330828 A1* | 10/2021 | Lan | ............... | G01V 8/10 |

* cited by examiner

DEVICE FOR SENSING INFRARED RADIATION

CROSS REFERENCE TO RELATED APPLICATION

This application claims the priority of Chinese Patent Application No. 2020228407768, entitled "Device for Sensing Infrared Radiation" filed with the Chinese Patent Office on Dec. 1, 2020, which is incorporated herein by reference in its entirety.

TECHNICAL FIELD

The application relates to the technical field of infrared sensing technology, and in particular to a device for sensing infrared radiation.

BACKGROUND ART

Currently, existing infrared sensors on the market are generally provided with wire outlets only in one direction, which has specific requirements for the use and installation of the sensor, and is difficult to satisfy the application of one sensor on lights with different shapes and structures. Thus, such sensors have limited utility.

SUMMARY

The embodiments aim to provide a device for sensing infrared radiation provided with three wire outlet holes, which solves a problem that the same one device for sensing infrared radiation cannot be applied to lights with different shapes and structures, and improves the applicability and practicability of the device for sensing infrared radiation.

In order to achieve the above-mentioned purpose, the present disclosure provides the following solutions.

A device for sensing infrared radiation includes a shell, a bottom cover, a Fresnel lens and an infrared probe. The shell includes a shell upper surface and a sidewall connected the shell upper surface and the bottom cover, the bottom cover is mounted at a bottom opening of the shell. The sidewall is provided with an arc-shaped notch configured for arranging the Fresnel lens and a side wire outlet hole; the shell upper surface is provided with an upper wire outlet hole; the bottom cover is provided with a lower wire outlet hole. The infrared probes are arranged inside the shell, and the upper wire outlet hole, the lower wire outlet hole and the side wire outlet hole are used for leading wires.

In some embodiments, the sidewall includes a first sidewall and a second sidewall connected to the first side wall, the first sidewall is provided with the arc-shaped notch, the second sidewall is provided with the side wire outlet hole.

The first sidewall is in a circular arc shape, and the second sidewall is in a rectangular shape.

In some embodiments, the device for sensing infrared radiation may further include a first hollow nut fixed to an outside of the shell at the upper wire outlet hole and a second hollow nut fixed to an inner surface of the bottom cover at the lower wire outlet hole.

In some embodiments, the bottom cover may be provided with drain holes.

In some embodiments, the first hollow nut may be integrally formed with the shell; and the second hollow nut may be integrally formed with the bottom cover.

In some embodiments, the device for sensing infrared radiation may further include a baffle plate mounted inside the shell.

In some embodiments, the device for sensing infrared radiation may further include a substrate, the infrared probe may be arranged inside the shell through the substrate, and the substrate may pass through the upper wire outlet hole, the lower wire outlet hole and the side wire outlet hole for leading wires.

In some embodiments, the substrate may be further provided with a light-emitting diode and a photosensitive diode.

In some embodiments, the light emitting diode may be one; and the photosensitive diode may be one.

In some embodiments, the infrared probe may be two or one, and an included angle between the two infrared probes may be 75 degrees.

According to the specific embodiments provided by the present disclosure, the embodiments have the following technical effects.

A device for sensing infrared radiation is disclosed and includes a shell, a bottom cover, a Fresnel lens and an infrared probe, the shell comprises a shell upper surface and a sidewall configured for connecting the shell upper surface and the bottom cover; the bottom cover is mounted at a bottom opening of the shell; the sidewall is provided with an arc-shaped notch configured for arranging the Fresnel lens and a side wire outlet hole; the shell upper surface is provided with an upper wire outlet hole; the bottom cover is provided with a lower wire outlet hole; the infrared probe is arranged inside the shell; and the upper wire outlet hole, the lower wire outlet hole and the side wire outlet hole are configured for leading wires. The device for sensing infrared radiation is provided with three wire outlet holes, which solves the problem that the same one device for sensing infrared radiation cannot be applied to lights with different shapes and structures, and improves the applicability and utility of the device for sensing infrared radiation.

BRIEF DESCRIPTION OF THE DRAWINGS

In order to more clearly illustrate the embodiments of the present invention or the technical solutions in the conventional art, drawings used in the embodiments will be briefly described below. It is apparent that the drawings in the following description are only some embodiments of the present invention, and those skilled in the art can obtain other drawings according to the drawings without creative efforts.

Figure 1:
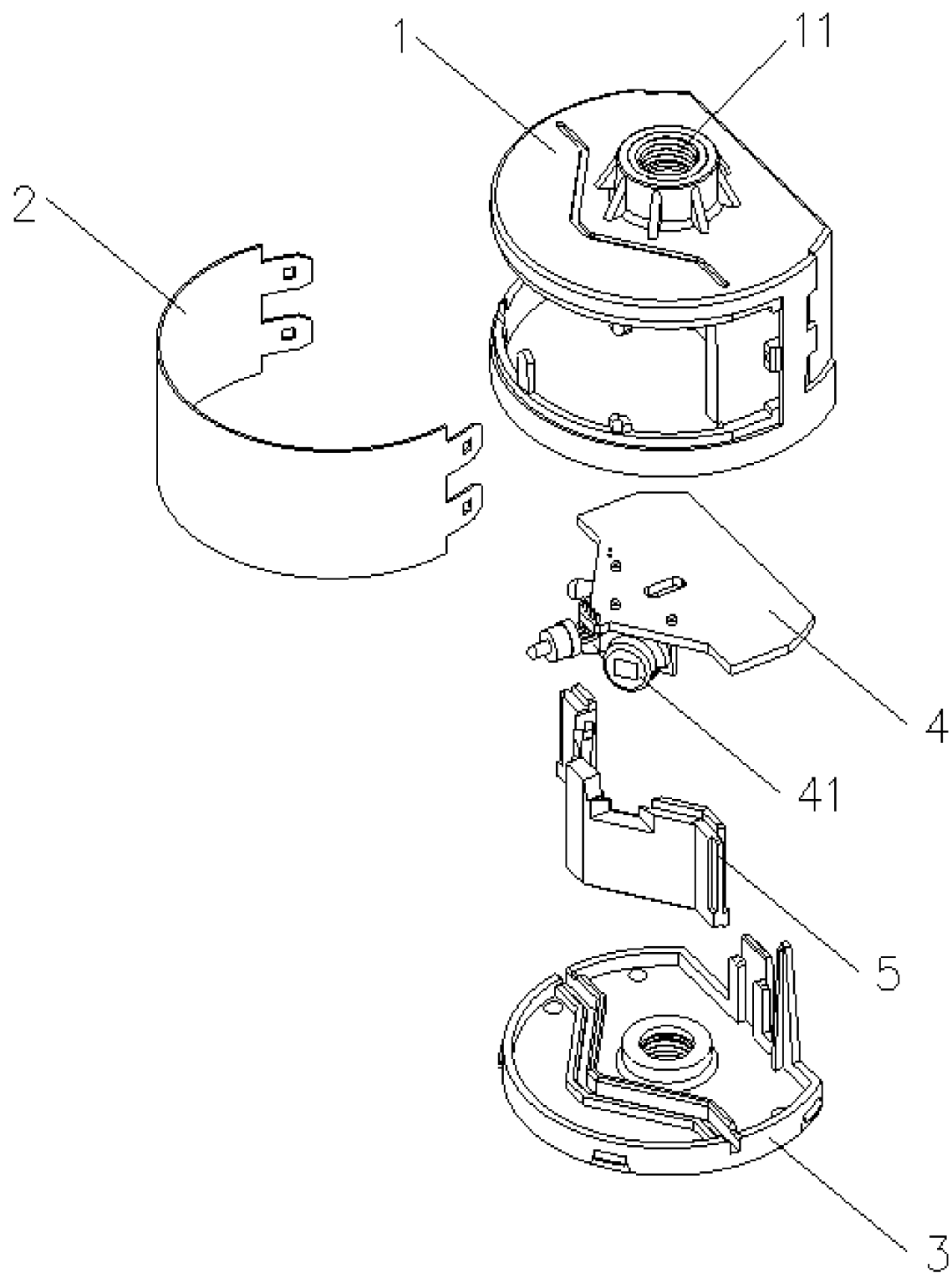
FIG. 1 is an exploded view of a device for sensing infrared radiation according to an embodiment of the present disclosure.

List of the reference characters: 1 shell, 2 Fresnel lens, 3 bottom cover, 4 substrate, 5 baffle, 6 shell upper surface, 7 second sidewall, 11 first hollow nut, 12 side wire outlet hole, 31 second hollow nut, 32 drain hole, 41 infrared probe, 42 light-emitting diode, 43 photosensitive diode.

DETAILED DESCRIPTION OF THE EMBODIMENTS

The technical solutions in the embodiments of the present disclosure will be clearly and completely described below with reference to the drawings in the embodiments of the present disclosure. It is apparent that the described embodiments are only a part of the embodiments of the present disclosure, and not all of the embodiments. All other embodiments, which can be obtained by those skilled in the art without inventive effort based on the embodiments of the present disclosure, are within the scope of protection of the present disclosure.

The embodiments aim to provide a device for sensing infrared radiation provided with three wire outlet holes, which solves a problem that the same one device for sensing infrared radiation cannot be applied to lights with different shapes and structures, and improves the applicability and practicability of the device for sensing infrared radiation.

In order to make the above-mentioned objects, features and advantages of the present disclosure more comprehensible, the present disclosure is described in detail with reference to the accompanying drawings and particular embodiments.

Figure 2:
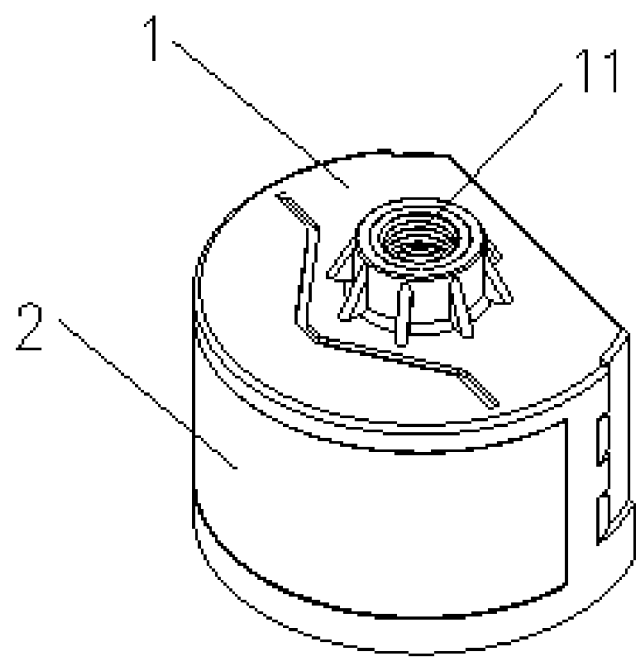
FIG. 2 is a left-side and top perspective view of a shell according to the embodiment of the present disclosure.
Figure 3:
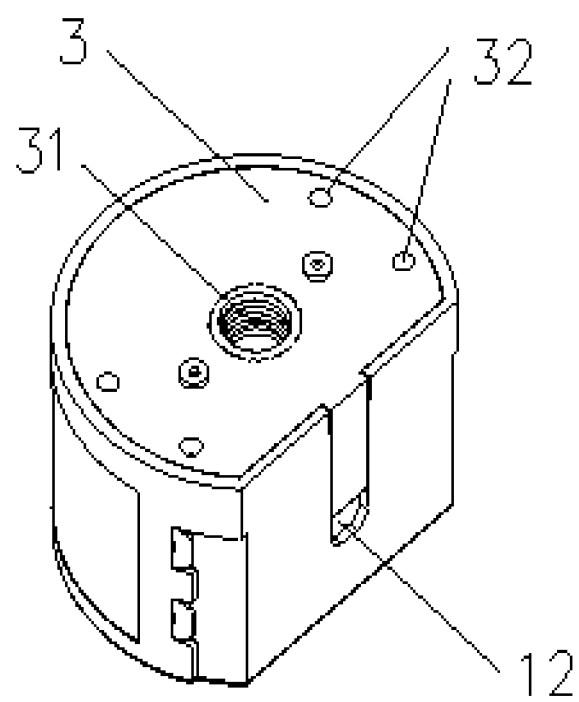
FIG. 3 is a right-side and bottom perspective view of a shell according to the embodiment of the present disclosure.

FIG. 1 is an exploded view of a device for sensing infrared radiation according to an embodiment of the present disclosure. FIG. 2 is a left-side and top perspective view of a shell according to an embodiment of the present disclosure. FIG. 3 is a right-side and bottom view of the shell according to the embodiment of the present disclosure. As shown in FIGS. 1, 2 and 3, a device for sensing infrared radiation in the embodiment of the present disclosure includes a shell 1, a Fresnel lens 2 and an infrared probe 41. The infrared probe 41 preferably adopts a pyroelectric passive infrared sensor. The shell 1 includes a shell upper surface 6 and a sidewall connected to the shell upper surface 6 and the bottom cover 3. The bottom cover 3 is mounted at a bottom opening of the shell 1. The sidewall is provided with an arc-shaped notch configured for arranging the Fresnel lens and a side wire outlet hole 12. The shell upper surface 6 is provided with an upper wire outlet hole. The bottom cover is provided with a lower wire outlet hole. The infrared probe 41 is arranged inside the shell 1. The upper wire outlet hole, the lower wire outlet hole, and the side wire outlet hole are used for leading the wires.

An opening is arranged at a bottom of the shell 1, and a snap joint for fixing the bottom cover 3 is arranged around the opening.

The structure of the device for sensing infrared radiation can realize five wire outgoing modes, which are wires outgoing from above, wires outgoing from below, wires outgoing from side, wires outgoing from above and below simultaneously, and wires outgoing from below and side simultaneously, as shown in FIGS. 5-9.

The Fresnel lens 2 can detect a human body movement signal in a range of 220 degrees in front of the device for sensing infrared radiation. Particularly, when a person enters into a sensing range at front of the device for sensing infrared radiation, heat released by the human body is collected on the infrared probe 41 through the Fresnel lens 2, the heat is received by the infrared probe 41, and then is converted by the infrared probe 41 into an electrical signal, which is input into an electronic circuit to drive a load to work.

As an optional embodiment, the sidewall includes a first sidewall and a second sidewall 7 connected to the first sidewall. The first sidewall is provided with the circular arc-shaped notch. The second sidewall 7 is provided with the side wire outlet hole 12.

The first sidewall is in a circular arc shape, and the second sidewall 7 is in a rectangular shape.

As an optional embodiment, the device for sensing infrared radiation further includes a first hollow nut fixed to an outside of the shell at the upper wire outlet hole and a second hollow nut fixed to an inner surface of the bottom cover at the lower wire outlet hole. As an optional embodiment, the bottom cover 3 is provided with drain holes 32, and the drain holes 32 may be four.

As an optional embodiment, the first hollow nut 11 is integrally formed with the shell 1. The second hollow nut 31 is integrally formed with the bottom cover 3. The first hollow nut 11 is integrally formed with the shell 1 by embedded into a mold for injection molding. The second hollow nut 31 is integrally formed with the bottom cover 3 by embedded in a mold for injection molding.

As an optional embodiment, the device for sensing infrared radiation further includes a baffle 5 mounted inside the shell 1 and used for waterproofing and preventing electric shock.

Figure 4:
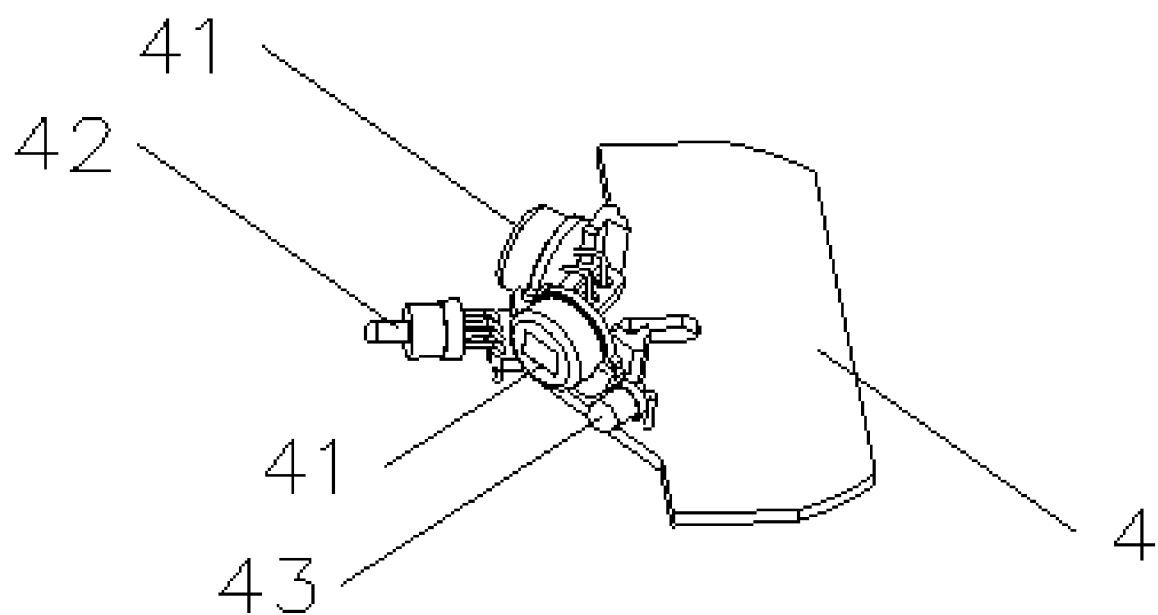
FIG. 4 is a schematic structural diagram of a substrate according to the embodiment of the present disclosure.
Figure 5:
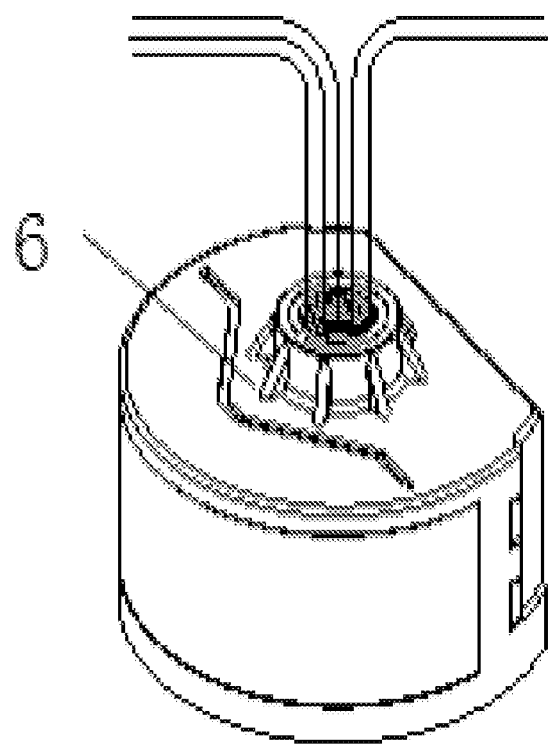
FIG. 5 is a schematic diagram of wires outgoing from above according to an embodiment of the present disclosure.
Figure 6:
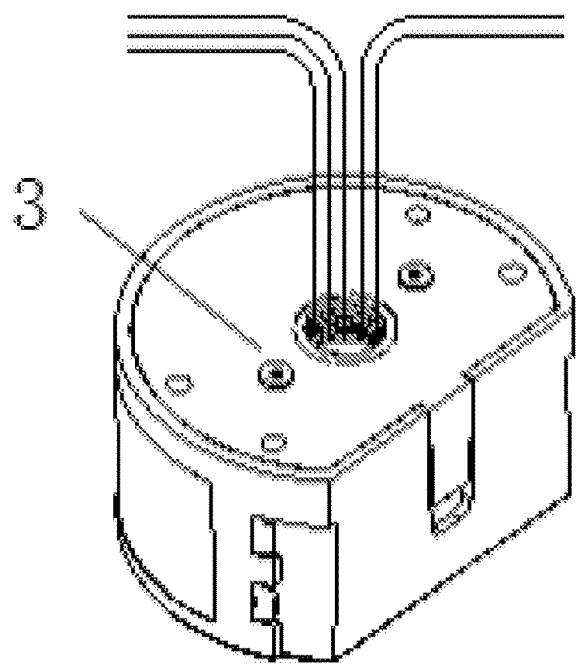
FIG. 6 is a schematic diagram of wires outgoing from below according to an embodiment of the present disclosure.
Figure 7:
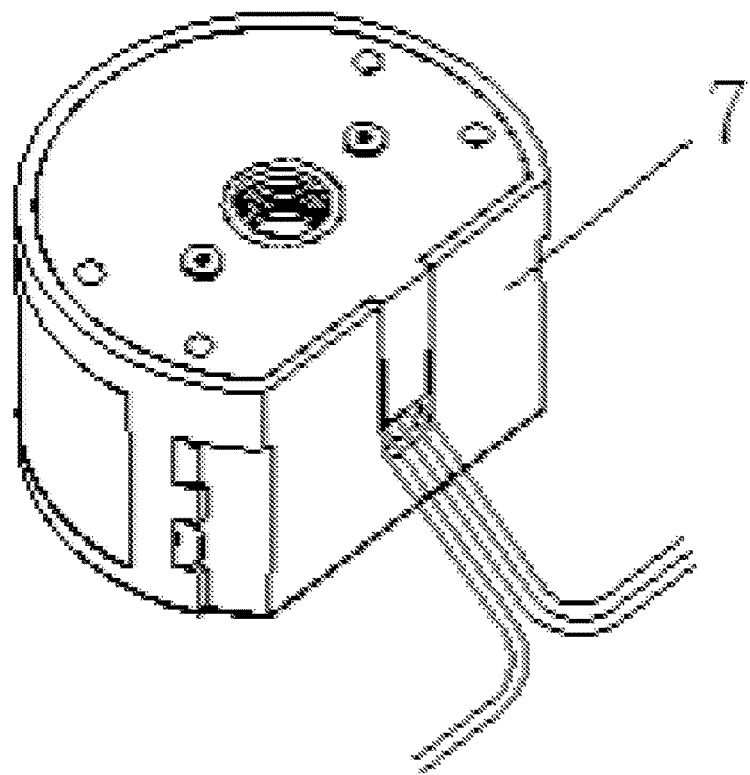
FIG. 7 is a schematic diagram of wires outgoing from side according to an embodiment of the present disclosure.
Figure 8:
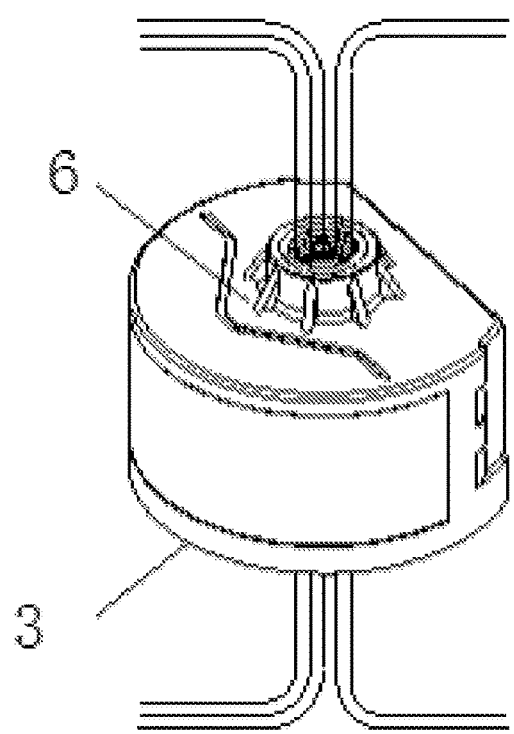
FIG. 8 is a schematic diagram of wires outgoing from above and below simultaneously according to an embodiment of the present disclosure.
Figure 9:
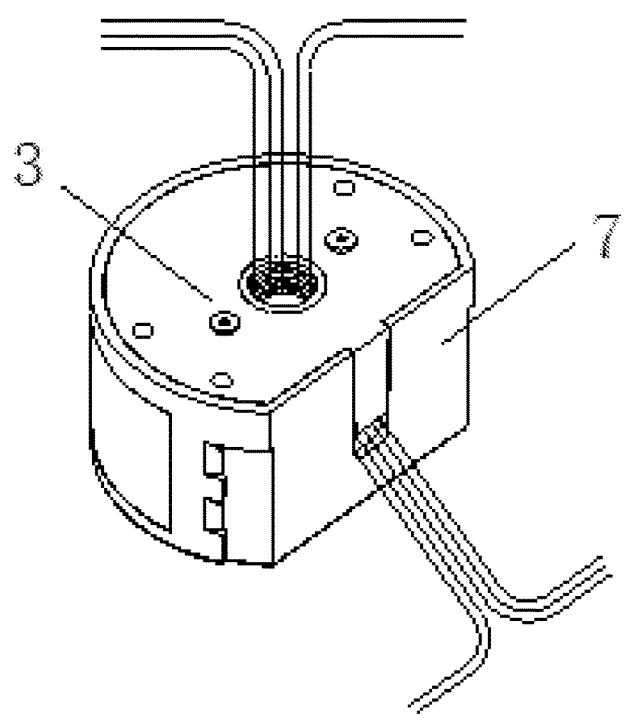
FIG. 9 is a schematic diagram of wires outgoing from below and side simultaneously according to an embodiment of the present disclosure.

FIG. 4 is a schematic structural diagram of a substrate according to the embodiment of the present disclosure. As shown in FIG. 4, the device for sensing infrared radiation of the embodiment further includes a substrate (for example, PCBA, Printed Circuit Board Assembly) 4. The infrared probe 41 is arranged inside the shell 1 through the substrate. Wires from the substrate are leaded outside through the upper wire outlet hole, the lower wire outlet hole and the side wire outlet hole. An angle between a detection surface of the infrared probe 41 and a surface of the substrate 4 is 90 degrees.

As an optional embodiment, the substrate 4 is further provided with a light-emitting diode 42 and a photosensitive diode 43.

As an optional embodiment, the light-emitting diode 42 is one. The light-emitting diode 42 is mounted on the substrate 4, and is configured to blink upon the infrared probe 41 detecting a human body and play an indication effect. The photosensitive diode 43 is one. The photosensitive diode 43 is mounted on the substrate 4, and is configured to recognize a brightness of the environment.

As an optional embodiment, the infrared probe 41 is two or one. When the two infrared probes 41 are arranged, an angle between the two infrared probes 41 is 75 degrees and a 220 degrees sensing range at front of the device for sensing infrared radiation can be monitored, and when one infrared probe 41 is arranged, a 180 degrees sensing range at front of the device for sensing infrared radiation can be monitored.

According to the specific embodiments provided by the present disclosure, the embodiments have the following technical effects.

A device for sensing infrared radiation is disclosed and includes a shell, a bottom cover, a Fresnel lens and an infrared probe; the shell includes a shell upper surface and a sidewall configured for connecting the shell upper surface and the bottom cover; the bottom cover is mounted at a bottom opening of the shell; the sidewall is provided with a circular arc-shaped notch configured for arranging the Fresnel lens and a side wire outlet hole; the shell upper surface is provided with an upper wire outlet hole; the bottom cover is provided with a lower wire outlet hole; the infrared probe is arranged inside the shell; and the upper wire outlet hole, the lower wire outlet hole and the side wire outlet hole are configured for leading wires. The device for sensing infrared radiation is provided with three wire outlet holes, which solves the problem that the same one device for sensing infrared radiation cannot be applied to lights with different shapes and structures, and improves the applicability and practicability of the device for sensing infrared radiation.

Various embodiments in the present specification are described in a progressive manner, and in each embodiment, the differences from the other embodiments are explained in detailed, and the same or similar parts between various embodiments can be referred to each other.

The principle and the embodiments of the present disclosure are explained by using specific examples in the present specification, and the above description of the embodiments is only used to help understand the method and the core idea of the present disclosure. Furthermore, for a person skilled in the art, according to the idea of the present disclosure, the specific embodiments and the application range may be changed. In summary, the description is not to be taken in a limiting sense.

The word "a" or "an" preceding an element does not exclude the presence of a plurality of such elements.

What is claimed is:

1. A device for sensing infrared radiation comprising: a shell, a bottom cover, a Fresnel lens and an infrared probe; wherein the shell comprises a shell upper surface and a sidewall connected to the shell upper surface and the bottom cover; the bottom cover is mounted at a bottom opening of the shell; the sidewall is provided with an arc-shaped notch configured for arranging the Fresnel lens and a side wire outlet hole; the shell upper surface is provided with an upper wire outlet hole; the bottom cover is provided with a lower wire outlet hole; the infrared probe is arranged inside the shell; and the upper wire outlet hole, the lower wire outlet hole and the side wire outlet hole are used for leading wires,
wherein the device for sensing infrared radiation is configured to be applied to lights with different shapes and structures.

2. The device for sensing infrared radiation according to claim 1, wherein the sidewall comprises a first sidewall and a second sidewall connected to the first sidewall; the first sidewall is provided with the arc-shaped notch; the second sidewall is provided with the side wire outlet hole; the first sidewall is in a circular arc shape; and the second sidewall is in a rectangular shape.

3. The device for sensing infrared radiation according to claim 1, further comprises: a first hollow nut fixed to an outside of the shell at the upper wire outlet hole and a second hollow nut fixed to an inner surface of the bottom cover at the lower wire outlet hole.

4. The device for sensing infrared radiation according to claim 3, wherein the first hollow nut is integrally formed with the shell; and the second hollow nut is integrally formed with the bottom cover.

5. The device for sensing infrared radiation according to claim 1, wherein the bottom cover is provided with drain holes.

6. The device for sensing infrared radiation according to claim 1, further comprises a baffle mounted inside the shell.

7. The device for sensing infrared radiation according to claim 1, further comprises a substrate, the infrared probe is arranged inside the shell through the substrate, and the wires from the substrate is leaded outside through the upper wire outlet hole, the lower wire outlet hole and the side wire outlet hole.

8. The device for sensing infrared radiation according to claim 7, wherein the substrate is further provided with a light-emitting diode and a photosensitive diode.

9. The device for sensing infrared radiation according to claim 7, comprising one or two infrared probes, and an included angle between two infrared probes is 75 degrees.

* * * * *

UNITED STATES PATENT AND TRADEMARK OFFICE
CERTIFICATE OF CORRECTION

| | | |
|---|---|---|
| PATENT NO. | : 11,650,096 B2 | |
| APPLICATION NO. | : 17/213429 | |
| DATED | : May 16, 2023 | |
| INVENTOR(S) | : Junnan Liao et al. | |

It is certified that error appears in the above-identified patent and that said Letters Patent is hereby corrected as shown below:

On the Title Page

Item (71), Add the following individual as a named Applicant:
-- Junnan Liao, Dongguan (CN) --

Signed and Sealed this
Thirteenth Day of June, 2023

Katherine Kelly Vidal
*Director of the United States Patent and Trademark Office*